United States Patent [19]

Romanowski

[11] Patent Number: 4,825,817

[45] Date of Patent: May 2, 1989

[54] REPLACEABLE COMBUSTION CHAMBER FOR TWO-CYCLE ENGINES

[76] Inventor: Jack R. Romanowski, P.O. Box 2359, Flagler Beach, Fla. 32036

[21] Appl. No.: 93,954

[22] Filed: Sep. 8, 1987

[51] Int. Cl.[4] .............................................. F02F 1/36
[52] U.S. Cl. ............................. 123/41.82 R; 123/668
[58] Field of Search .................. 123/41.82 R, 668, 669

[56] References Cited

U.S. PATENT DOCUMENTS

| | | | |
|---|---|---|---|
| 1,156,312 | 10/1915 | Regenbogen et al. | 123/668 X |
| 1,260,860 | 3/1918 | Bie | 123/41.82 R |
| 1,647,848 | 11/1927 | Woolson | 123/41.82 R |
| 2,049,205 | 7/1936 | Jardine | 123/668 X |
| 2,113,629 | 4/1938 | Rabezzana | 123/668 X |
| 2,944,336 | 7/1960 | Stancliff et al. | 123/41.82 R |
| 3,062,614 | 11/1962 | Stancliff et al. | 123/41.82 R |
| 4,532,896 | 8/1985 | Nakahara et al. | 123/668 X |

FOREIGN PATENT DOCUMENTS

| | | | |
|---|---|---|---|
| 165232 | 7/1949 | Austria | 123/668 |
| 295221 | 4/1932 | Italy | 123/41.82 R |

*Primary Examiner*—Tony M. Argenbright
*Assistant Examiner*—Eric R. Carlberg
*Attorney, Agent, or Firm*—James H. Beusse

[57] ABSTRACT

An assembly for an internal combustion engine comprises a unitary cylinder head having at least one opening extending therethrough and at least one combustion chamber housing removably associated with the unitary cylinder head and received at least in part in the one opening. The chamber is formed for cooling fluid within a part of the opening within the cylinder head such that cooling fluid circulates about the combustion chamber housing. A method is provided for assembling the combustion chamber housing within the cylinder head and for assembling the composite structure to an internal combustion engine.

11 Claims, 1 Drawing Sheet

REPLACEABLE COMBUSTION CHAMBER FOR TWO-CYCLE ENGINES

The present invention relates to internal combustion engines and, more particularly, to replaceable combustion chambers for two-cycle engines.

Two-cycle internal combustion (IC) engines are characterized by one or more cylinders consisting essentially of cylindrical bores within an engine or cylinder block. A piston fits within the cylinder such that it can move reciprocally. One end of the cylinder is closed by a cylinder head to establish a combustion chamber between a top of the piston and the cylinder head. The two cycle cylinder construction differs from four cycle cylinder construction in that the latter incorporates intake and exhaust valves in the cylinder head while the two cycle engine has intake and exhaust ports in a wall of the cylinder.

When the piston has reciprocated to its lowest position in the cylinder, the maximum volume of the cylinder is defined. The minimum cylinder volume is defined when the piston is at its highest position in the cylinder. The ratio of maximum volume to minimum volume is referred to as compression ratio. The greater the compression ratio, the more efficient the engine. In most IC engines, the cylinder head is manufactured with a shaped pocket or chamber which defines the cylinder volume at the highest piston position and therefore directly affects the performance of the engine.

While the combustion chamber definition is the single most important function of the cylinder head, the head also serves to dissipate heat generated by the combustion process. For this reason, water cooled cylinder heads are generally cast in two sections, one of which is a cover for the cylinder head. Such two-piece casting is necessary in order to provide for passageways within the head for water circulation. Alternatively, a single piece head can be formed and thereafter machined (cored) in the areas behind the combustion chamber. In either instance, compromises are made in the physical configuration of the cylinder head to simplify manufacturing. Typically, such compromises result in unequal wall thicknesses and therefore unequal cooling of the combustion chamber and also in recessed or thinned areas which present structural weaknesses.

There are many applications which require changes in cylinder head design. Such changes may be necessitated not only by a need to vary engine compression ratio but also to adapt an engine for different octane rated fuels or for different fuels. In particular, it is common practice to modify cylinder heads in order to develop high performance engines. The most common modification is the size and/or shape or position of the combustion chamber. Some of these changes are so diverse as to require different cylinder head castings. In some situations, such as in racing, it is often desirable to be able to modify a cylinder head to obtain a performance characteristic suitable for immediate conditions. Since machining of cylinder heads is not practical at such events, many different cylinder heads must be carried as replacement parts. Obviously, some compromises must be made in order to limit the number of different types of heads which are carried.

SUMMARY OF THE INVENTION

It is an object of the present invention to provide an apparatus which obviates the above and other disadvantages of the prior art.

It is another object of the present invention to provie a cylinder head for a two-cycle internal combustion engine which is easily manufactured and modified.

It is still another object of the present invention to provide a cylinder head with a replaceable combustion chamber for an internal combustion two-cycle engine.

The above and other objects and advantages are obtained in an improved cylinder head for an internal combustion two-cycle engine which incorporates a combustion chamber housing which is removable and separate from the cylinder head. The combustion chamber housing comprises a unitary body adapted to be arranged in removable association with the cylinder head and includes a pair of opposite end portions, a pair of means arranged at least adjacent the opposite end portions for respectively sealing in engagement with confronting parts of the cylinder head when the unitary body is arranged in removable association with the cylinder head, and recessed means for defining a combustion chamber in the unitary body and intersecting with one of the opposite end portions. One of the sealing means comprises an O-ring seal disposed in the unitary body adjacent to the other of the opposite end portions. Another of the sealing means comprises a generally annular surface on the other of the opposite end portions. One of the sealing means may comprise a generally annular surface adjacent the one opposite end portion. The combustion chamber housing includes a threaded opening in the unitary body communicating with the recess means and the other of the opposite end portions. In one embodiment, the recess means is eccentrically located in the unitary body to thereby offset the combustion chamber formed by the recessed means. Within the cylinder head there is defined a coolant chamber for cooling fluid such that the coolant fluid circulates about the combustion chamber housing. The cylinder head includes apertures opening externally for admitting and exiting the coolant fluid through the cylinder head.

The present invention also includes a method of assembling an internal combustion engine having a unitary cylinder head, at least one combustion chamber housing, and at least one pin. The unitary cylinder head includes at least one surface, at least one opening intersecting with the at least one surface, and at least one positioning aperture intersecting with the at least one surface, the combustion chamber housing includes a generally cylindric part, a flange spaced from the cylindric part, and at least another positioning aperture extending through the flange, the method comprises the steps of rotatably disposing the cylindric part of the combustion chamber housing in the at least one opening of the unitary cylinder head and overlaying the flange of the combustion chamber housing at least in part with the at least one surface of the unitary cylinder head. The method includes the steps of rotating the combustion chamber housing into at least one preselected assembled position relative to the unitary cylinder head and aligning thereby the at least another position aperture in the flange with the at least one positioning aperture in the unitary cylinder head when the combustion chamber housing is in its at least one preselected assembled position. The method further includes the step of inserting the pin into the aligned at least one and another positioning apertures and retaining thereby the combustion chamber housing in its at least one preselected assembled position against rotational displacement relative to the cylinder head. When the flange is generally circular and the combustion chamber housing further includes recess means eccentrically located in the flange with respect to the center thereof for defining combustion chamber, the rotating and aligning steps outlined above further include eccentrically locating the recess means about the center of the flange when the combustion chamber housing is in at least one preselected assembled position. The step of rotatively disposing and overlaying may include establishing a chamber for cooling fluid within the at least one opening between the unitary cylinder head and the combustion chamber housing. The method of assembling may also include the additional step of capturing the flange between a block and the at least one surface for coupling the combustion chamber with a cylinder in an internal combustion engine block.

DESCRIPTION OF THE DRAWING

For a better understanding of the present invention, reference may be had to the following detailed description taken in conjunction with the accompanying drawings in which.

DETAILED DESCRIPTION

Figure 1:
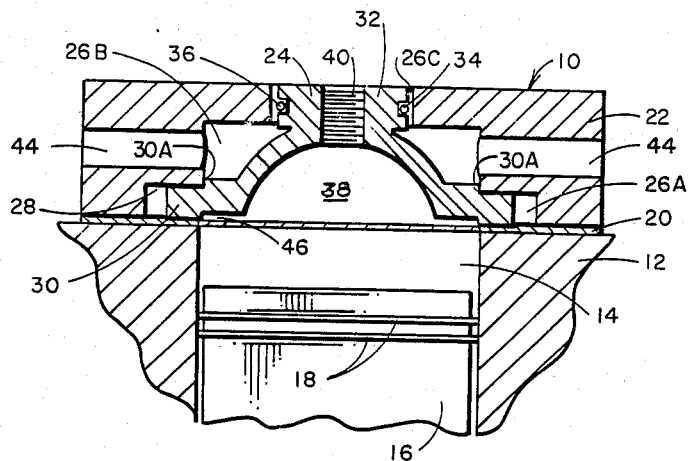
FIG. 1 is a cross sectional view of my inventive cylinder head with a removable combustion chamber housing overlaying a cylindric bore of an internal combustion engine block having a piston disposed within the cylindric bore.
Figure 2A:
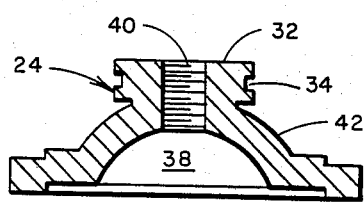
FIGS. 2A, 2B and 2C are cross section, top perspective and bottom perspective views respectively of my combustion chamber housing or insert.
Figure 2B:
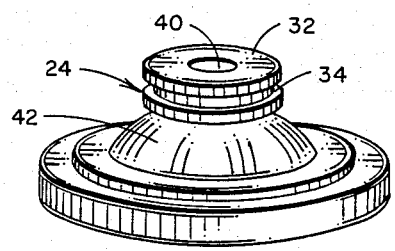
Figure 2C:
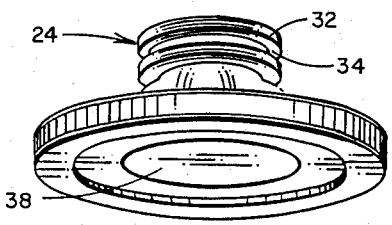
Figure 3A:
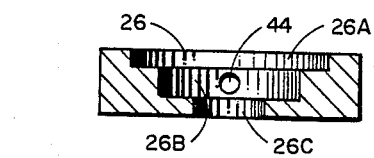
FIGS. 3A and 3B are cross sectional and bottom perspective views of one form of my new cylinder head.
Figure 3B:
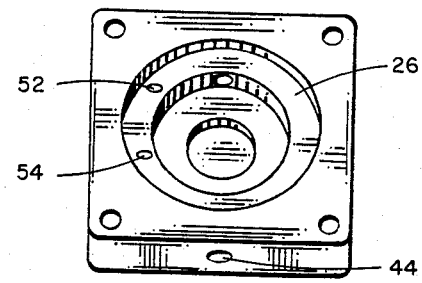

Referring now to FIG. 1, there is shown a cross sectional view of my new and inventive cylinder head assembly 10 positioned over an internal combustion engine block 12 having a cylindric bore or cylinder 14 within which there is disposed a piston 16. The engine block 12 and piston 16 are of standard commercial design and are only shown in partial cut away view. The piston 16 includes multiple oil rings 18 of a type well known in the art. Positioned between the engine block 12 and the cylinder head assembly 10 is a cylinder head gasket 20 which acts to seal the interface between the cylinder head assembly 10 and the engine block 12 to prevent leakage of gasses from the cylinder 14 and also to prevent leakage of cooling fluid which may be circulating within cylinder head 10.

In the embodiment of FIG. 1, the cylinder head assembly 10 comprises a unitary cast cylinder head 22 having an opening in a face positionable adjacent the engine block 12 for receiving a combustion chamber housing 24. Considering FIGS. 2A, 2B, 2C, 3A and 3B in conjunction with FIG. 1, it can be seen that the cylinder head in one form has a generally cylindrical stepped opening 26 with the largest portion of the opening 26 being adjacent the engine block 12. The largest portion of the stepped opening is indicated at 26A in FIG. 1 and defines an internal lip or flange 28 for capturing an outer annular flange 30 of combustion chamber housing 24. A second stepped opening 26B defines a coolant flow area for allowing cooling fluid to circulate around an outer surface of combustion chamber housing 24. A third stepped portion 26C penetrates through an upper or outer portion of cylinder head 22 and provides access to the combustion chamber housing 24. In the preferred embodiment, combustion chamber housing 24 includes a portion 32 which fits relatively snuggly within the opening 26C and which further includes a circumferential slot 34 for receiving a sealing means 36 such as an O-ring for effecting a water type seal between the portion 32 and the sides of the opening 26C.

The combustion chamber housing 24 comprises a unitary body adapted to be arranged in removable association with cylinder head 22. Housing 24 includes a pair of opposite end portions, i.e., portion 32 and flange 30. When assembled, sealing means are arranged adjacent the opposite end portions for sealing the housing 24 within cylinder head 22 and between head 22 and block 12. The O-ring 36 forms one sealing means while flange 30 forms another sealing means. Gaskets or seals 20 and/or 60 may augment flange 30. A recess means intersecting one of the opposite end portions within flange 30 defines a combustion chamber 38. The combustion chamber 38 may take any desired shape but is preferably and in most applications formed as a hemispherical chamber. A threaded spark plug (not shown) is threaded into a tapped aperture 40 extending through the upper portion 32 of the combustion chamber housing so that the ignition tip of the spark plug extends to the combustion chamber 38. Accordingly, the combustion chamber housing 24 may be formed with a spherical shaped outer surface 42 so as to define a combustion chamber housing having substantially uniform thickness of material between the actual combustion chamber 38 and the coolant chamber 26B. Such an arrangement assures more uniform cooling of the combustion chamber housing 24. Cooling fluid can be passed into the coolant chamber 26B through apertures or coolant flow ports 44 drilled into the unitary cylinder head.

Figure 5:
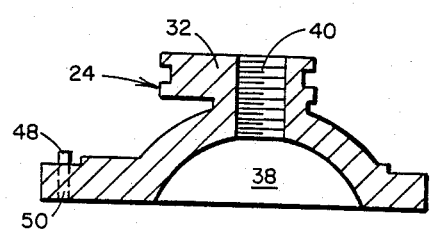
FIG. 5 is a cross sectional view of one form of combustion chamber housing using an offset or eccentrically positioned combustion chamber.

The replaceable combustion chamber housing 24 may be formed with a predetermined squish band 46 of a desired configuration. While the squish band 46 is shown merely as an annular recess in the face of combustion chamber housing 24, it will be appreciated that the squish band may be tapered or may be omitted depending upon the type of application for which the combustion chamber housing is designed. Furthermore, in many applications it is desirable to offset or eccentrically locate the combustion chamber 38 to effect a different or improved heat distribution through the cylinder so as to improve the life of piston 16. FIG. 5 is an illustration of a combustion chamber housing having an offset or eccentrically located combustion chamber 38. It will be noted that the form of combustion chamber 24 of FIG. 5 is essentially the same as that shown in FIGS. 1 and 2 with the exception of having the combustion chamber 38 offset and a corresponding offset being effected in the upper portion 32 of the housing 24. The spark plug aperture 40 is drilled and tapped as to be centrally located with respect to combustion chamber 38.

The concept of offset combustion chambers is well known in the art of high performance internal combustion engines. However, in multiple cylinder V-type engines, it has been necessary to define the prior art cylinder heads in terms of their left or right side positions since the location of the offset combustion chamber must be varied in order to accommodate opposite sides of a typical V type internal combustion engine. In my invention, it is no longer necessary to define a left and right combustion chamber housing. As shown in FIG. 5, my replaceable combustion chamber housings 24 when formed with eccentric or offset combustion chambers 38 include a pin 48 fitted through an aperture 50 in a flange 30 of the combustion chamber housing 24. The cylinder head 22 includes first and second apertures 52 and 54 drilled into surface 28, the apertures 52 and 54 being sized to accept the pin 48. Depending upon whether the cylinder head is used on a right or left side of a V type engine, the combustion chamber housing 24 can be rotated so as to position the pin 48 in either the aperture 52 or the aperture 54 so as to accommodate use in either a left side or a right side of such an engine. The advantage of such a feature is that it is no longer necessary to stock separate cylinder heads and combustion chambers for left side and right side engine replacements. Thus, my invention reduces the number of components which must be stocked to accommodate different types of engines. Furthermore, my invention eliminates the need to stock replacement cylinder heads and requires only that combustion chamber housing 24 be stocked as a replacement part.

An alternative method for providing for alignment of offset combustion chambers is to eccentrically position portion 32 and aperture 26C while maintaining chamber 26B and alignment step 30A concentric. By eccentrically locating one element of housing 24 and one element of head 22, any two elements can be used for alignment.

Figure 4:
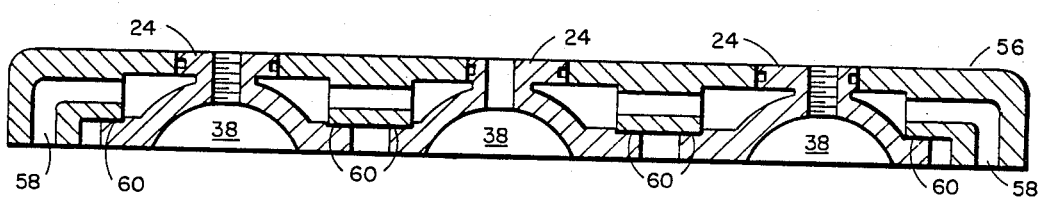
FIG. 4 is a cross sectional view of one form of the cylinder head and combustion chamber insert for a multi cylinder two cycle internal combustion engine.

Turning now to FIG. 4, there is shown an example of one embodiment of cylinder head assembly for use with a multi cylinder internal combustion engine. The cylinder head 56 illustrated in FIG. 4 is typical of a V6 type internal combustion engine. In this arrangement, the coolant fluid circulates through the engine block (not shown) and up through apertures 58 into the cylinder head 56. The multi combustion chamber unit of FIG. 4 illustrates an assemble in which two of the combustion chamber housings 24 include eccentrically located combustion chambers 38. It should also be noted in FIG. 4 and in FIG. 1 that there are seals 60 positioned between an upper surface of flange 30 and the surface 28 of cylinder head 56 or 22. The seals 60 serve to seal the coolant chambers 26B against escape of the circulating cooling fluid.

The method of using or assembling an IC engine using my invention may be characterized by first forming a unitary cylinder head 22 having at least one opening 26 extending therethrough, the opening 26 being shaped to accept a unitary combustion chamber housing 24, positioning the housing 24 at least in part within the opening 26 such that the housing 24 is removably associated with cylinder head 22 but in sealing relationship therewith so as to form a cooling chamber 26B between the cylinder head 22 and an outer surface 42 of housing 24. The assembled head 22 and housing 24 may be releasably secured to an IC engine block 12 by means well known in the art, e.g., bolts, whereby at least a part of the housing 24, e.g., the flange 30, is captured between the head 22 and block 12 to retain the housing 24 in its assembled position in head 22 against axial displacement, i.e., displacement in the direction of motion of piston 16. The assembling process preferably also includes placing a sealing means 20 at the interface between head 22 and block 12, a sealing means 60 between flange 30 and head 22 and a sealing means 36 between portion 32 and head 22. When assembled, the chamber 38 is positioned in facing relationship with cylindric bore or cylinder 14. A spark plug is threaded into the aperture 40 so as to have its tip communicating with chamber 38. For applications requiring offset or eccentrically positioned chamber 38, the method also includes the steps of rotating the housing 24 to a predetermined angular orientation and pinning the housing 24 to the head 22 so as to prevent further rotation. The pinning step includes drilling of mating apertures through flange 30 and into surface 28 of head 22 and inserting a pin 48 through the apertures.

While the invention has been described in what is presently considered to be a preferred embodiment, certain modifications and variations will become apparent without departing from the teachings herein. For example, the portion 32 could be sized differently and sealed against head 22 on its top surface rather than a circumferential surface. Since this change would force housing 24 toward block 12, it might then be possible to omit capturing of flange 30 by head 22. Accordingly, it is intended that the description be interpreted as a preferred but not limiting embodiment.

I claim:

1. A method of assembling an internal combustion engine having a unitary cylinder head with at least one opening extending therethrough, and at least one combustion chamber housing, the method comprising the steps of:

placing the at least one combustion chamber housing at least in part within the at least one opening and removably associating thereby the unitary cylinder head and the at least one combustion chamber housing in an assembled position, the unitary cylinder head and the at least one combustion chamber housing each including at least one positioning aperture and wherein the placing and removably associating step includes aligning the at least one positioning aperture in the at least one combustion chamber housing generally axially with the at least one pin receiving opening in the cylinder head and inserting a pin into the axially aligned positioning apertures thereby to retain said at least one combustion chamber housing against rotational displacement from its assembled position with the unitary cylinder head; and defining a chamber means for a cooling fluid between the unitary cylinder head and the at least one combustion chamber housing in their assembled position.

2. The method as set forth in claim 1 wherein the internal combustion engine also has a block and wherein the method further comprises the additional step of releasably securing the unitary cylinder head to the block and capturing a part of the at least one combustion chamber housing between the unitary cylinder head and the block thereby to retain the unitary cylinder head and the at least one combustion chamber housing against axial displacement from their assembled position.

3. The method as set forth in claim 2 wherein the block includes at least one cylinder and the at least one combustion chamber housing includes recess means defining a combustion chamber, and wherein the additional step includes communicating the recess means in facing relation with the at least one cylinder.

4. The method as set forth in claim 3 wherein the internal combustion engine also has at least one spark plug and the at least one combustion chamber housing further includes a threaded opening intersecting with the recess means, and wherein the method comprises the further additional step of passing a part of the at least one spark plug through a part of the at least one opening and into threaded engagement with the threaded opening.

5. A method of assembling an internal combustion engine having a unitary cylinder head, at least one combustion chamber housing, and at least one pin, the unitary cylinder head including at least one surface, at least one opening intersecting with at least one surface, and at least one positioning aperture intersecting with the at least one surface, the combustion chamber housing including a generally cylinder part, a flange spaced from the cylindric part, and at least one positioning aperture extending through the flange, the method comprising the steps of:

rotatably disposing the cylindric part of the combustion chamber housing in the at least one opening of the unitary cylinder head and overlaying the flange of the combustion chamber housing at least in part with the at least one surface of the unitary cylinder head;

rotating the combustion chamber housing into at least one preselected assembled position relative to the unitary cylinder head and aligning thereby the at least one positioning aperture in the flange with the at least one positioning aperture in the unitary cylinder head when the combustion chamber housing is in its at least one preselected assembled position; and inserting the pin into the aligned positioning apertures in the cylinder head and combustion chamber flange, respectively, and retaining thereby the combustion chamber housing in its at least one preselected assembled position against rotational displacement relative to the cylinder head.

6. The method as set forth in claim 5 wherein the flange is generally circular and the combustion chamber housing further includes recess eccentrically located in the flange with respect to the center thereof for defining a combustion chamber, and wherein the rotating and aligning step includes eccentrically locating the recess means about the center of the flange when the combustion chamber housing is in the at least one preselected assembled position.

7. The method as set forth in claim 5 wherein the rotatably disposing and overlaying step includes establishing a chamber means for a cooling fluid within the at least one opening between the unitary cylinder head and the combustion chamber housing.

8. The method as set forth in claim 5 wherein the internal combustion engine further includes a block having at least one cylinder therein and the flange has a recess means therein for defining a combustion chamber, and wherein the method further comprises the additional step of capturing the flange between the block and the at least one surface for coupling the combustion chamber with the cylinder.

9. The method as set forth in claim 8 further comprising the further additional step of releasably securing the unitary cylinder head and the block.

10. A replaceable combustion chamber housing in the form of a unitary body adapted to be arranged in removable association with a cylinder head of an internal combustion engine and having a hemispherical chamber formed in the unitary body facing a first surface thereof, a circular flange circumscribing said chamber and coextensive with said first surface, and a spark plug housing extending from said chamber in a direction opposite from said first surface, said spark plug housing being circular and concentric with said flange whereby each of said chamber, said flange and said spark plug housing appear as circles when reflected onto a plane of said first surface.

11. A method of assembling an internal combustion engine having a unitary cylinder head, at least one combustion chamber housing, the unitary cylinder head including at least one surface, at least one opening intersecting with the at least one surface, the combustion chamber housing including a generally cylindrical part, a flange spaced from the cylindric part, recess means eccentrically located in the flange with respect to the center thereof for defining a combustion chamber, and a spark plug housing eccentrically positioned with respect to a center of the flange, the method comprising the steps of:

rotatably disposing the cylindric part of the combustion chamber housing in the at least one opening of the unitary cylinder head and overlaying the flange of the combustion chamber housing at least in part with the at least one surface of the unitary cylinder head;

rotating the combustion chamber housing into at least one preselected assembled position relative to the unitary cylinder head and eccentrically locating the spark plug housing about the center of the flange when the combustion chamber housing is in the at least one preselected assembled position thereby retaining the combustion chamber housing in its at least one preselected assembled position against rotational displacement relative to the cylinder head.

* * * * *